(12) United States Patent
Goebel et al.

(10) Patent No.: US 7,625,661 B2
(45) Date of Patent: Dec. 1, 2009

(54) DIFFUSION MEDIA WITH CONTINUOUS MICRO-POROUS LAYERS INCORPORATING NON-UNIFORMITY

(75) Inventors: Steven G. Goebel, Victor, NY (US); Chunxin Ji, Rochester, NY (US); Jeanette E. O'Hara, Honeoye, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 647 days.

(21) Appl. No.: 11/215,395

(22) Filed: Aug. 30, 2005

(65) Prior Publication Data

US 2007/0048593 A1    Mar. 1, 2007

(51) Int. Cl.
H01M 4/00 (2006.01)
H01M 2/14 (2006.01)
H01M 4/88 (2006.01)

(52) U.S. Cl. ............... 429/44; 429/38; 502/101
(58) Field of Classification Search ............ 429/44; 502/101
See application file for complete search history.

(56) References Cited

U.S. PATENT DOCUMENTS

| | | | |
|---|---|---|---|
| 4,038,463 A | * | 7/1977 | Lamarine et al. ............ 429/44 |
| 5,840,438 A | | 11/1998 | Johnson et al. |
| 6,117,579 A | | 9/2000 | Gyoten et al. |
| 6,521,369 B1 | | 2/2003 | Mercuri et al. |
| 6,579,639 B1 | | 6/2003 | Gyoten et al. |

OTHER PUBLICATIONS

U.S. Appl. No. 10/925,853, filed Aug. 25, 2004, Ji, et al.
Diffusion Media for PEM Fuel Cells, M. Mathias, J. Roth, J. Fleming, and W. Lehnert, Handbook of Fuel Cells, Chapter 46, V. 3, Editors: W. Vielstich, H. Gasteiger and A. Lamm, John Wiley & Sons, Ltd. 2003.

* cited by examiner

Primary Examiner—Patrick Ryan
Assistant Examiner—Muhammad Siddiquee

(57) ABSTRACT

A diffusion media and micro-porous media combination for a fuel cell. A diffusion layer is composed of a diffusion media and has a first (electrode) side and an opposite second (flow-field) side, wherein at least one of the first and second sides has a geometric pattern formed therein comprising a multiplicity of mutually spaced apart regions. A micro-porous media fills the multiplicity of regions and a micro-porous layer composed of the micro-porous media is continuously applied to the first surface.

9 Claims, 4 Drawing Sheets

DIFFUSION MEDIA WITH CONTINUOUS MICRO-POROUS LAYERS INCORPORATING NON-UNIFORMITY

TECHNICAL FIELD

The present invention relates to fuel cells and, more particularly, to micro-porous layers incorporating non-uniformity of micro-porous media within diffusion media of fuel cells.

BACKGROUND OF THE INVENTION

Electrochemical fuel cells convert fuel and oxidant to electricity and reaction product. Solid polymer electrochemical fuel cells generally employ a membrane electrode assembly ("MEA") comprising a solid polymer electrolyte or ion exchange membrane disposed between two planar electrode diffusion layers or substrates (diffusion media) formed of porous, electrically conductive sheet material, such as carbon fiber paper or carbon cloth. Suitable carbon fiber paper sheet material is available, for example, from Toray Industries, Inc. with grade designations such as TGP090, TGP060 and TGP030 having thicknesses of 0.27 mm, 0.19 mm and 0.10 mm, respectively, and a porosity of approximately 70%. Carbon fiber paper sheet material is also available in other thicknesses and porosities. Typically, the structure of the electrode substrate is substantially uniform, on a macroscopic scale, as it is traversed in plane (parallel to the planar major surfaces of the electrode substrate, i.e. the XY plane of FIG. 1) at any depth.

The MEA contains a layer of electrocatalyst, typically in the form of finely comminuted platinum, at each membrane/electrode substrate interface to induce the desired electrochemical reaction. The electrodes are electrically coupled to provide a path for conducting electrons between the electrodes through an external load.

At the anode, the fuel stream moves through the porous anode substrate (anode diffusion media) and is oxidized at the anode electrocatalyst layer. At the cathode, the oxidant stream moves through the porous cathode substrate (cathode diffusion media) and is reduced at the cathode electrocatalyst layer to form a reaction product. In electrochemical fuel cells employing hydrogen as the fuel and oxygen-containing air (or substantially pure oxygen) as the oxidant, the catalyzed reaction at the anode produces hydrogen cations (protons) from the fuel supply. The ion exchange membrane facilitates the migration of protons from the anode to the cathode. In addition to conducting protons, the membrane isolates the hydrogen-containing fuel stream from the oxygen-containing oxidant stream. At the cathode electrocatalyst layer, oxygen reacts with the protons that have crossed the membrane to form water as the reaction product.

In electrochemical fuel cells, the MEA is typically interposed between two fluid flowfield plates (anode and cathode plates). The plates act as current collectors, provide support to the MEA, provide means for access of the fuel and oxidant to the anode and cathode surfaces, respectively, and provide for the removal of water formed during operation of the cells. As the oxidant stream travels through the fluid flow channels typically formed in the fluid flowfield plates of the cell, the stream transports water passing through the cathode diffusion media that is produced as the product of the electrochemical reaction. The water is transported either as water vapor or as entrained water droplets. As a result, the portion of the flowfield into which the oxidant stream is introduced and through which the oxidant stream initially flows is drier than the portion of the flowfield through which the oxidant stream flows just prior to being exhausted from the fuel cell. In the latter portion of the oxidant flowfield, the oxidant stream can become saturated with water, in which case two phase flow occurs, that is, the oxidant stream contains water vapor and also has liquid water entrained in the stream.

Wet and dry regions of the flowfield can detrimentally affect fuel cell performance and accelerate the degradation of performance over time. Fuel cell performance is defined as the voltage output from the cell for a given current density; the higher the voltage for a given current density, the better. Control of water transport perpendicular to the plane of the electrodes (the Z direction of FIG. 1) away from the cathode to the oxidant flowfield; that is, movement of water in the direction from the cathode electrocatalyst layer to the oxidant flow channels (the "free stream"), is important to optimizing fuel cell performance. The "free stream" is the fluid stream within the reactant distribution channels.

In addition to the control of water transport, control of oxidant transport in the direction from the oxidant flow channels or free stream to the cathode electrocatalyst layer, is important to optimizing fuel cell performance. The concentration of oxygen at the electrocatalyst layer directly affects, fuel cell performance because oxygen concentration affects the rate of the electrochemical reaction.

The diffusion media serve several functions. One of these functions is the diffusion of reactant gases therethrough for reacting, within the respective catalyst layer. Another is to diffuse reaction products, namely water, away from the catalyst layer. Additionally, the diffusion media must conduct electrons and heat between the catalyst layers and flowfield plates.

The water generated by the electrochemical reaction on the catalytic layer on the cathode side mostly leaves the electrode as a vapor and condenses in the cathode diffusion media. If the condensed water remains around the catalytic layer, the oxygen gas is prevented from reaching the reaction area and cell performance is lowered. Avoiding a continuous water film in reactant gas pathways is critical to maintaining fuel cell performance.

To solve these problems, various countermeasures have been proposed and tried in the prior art, which include the use of a surface layer or layers on the diffusion media. A micro-porous layer (MPL), well known in the art, consisting of carbon or graphite particles mixed with a polymeric binder is the most common surface layer applied to the surfaces of diffusion media. An MPL has, typically, a pore size between 100 nanometers and 500 nanometers whereas diffusion media, typically, have pore sizes between 10 micrometers and 30 micrometers. Thus, the pore size of an MPL is smaller than the pore sizes of the diffusion media on which it is applied. This is one reason, among others, that an MPL provides an effective way to remove product water from the electrode. It also may reduce electrical contact resistance with the adjacent catalyst layer. An MPL may be applied to a surface of a diffusion media by, for example, screen printing, knife coating, and spraying, and is usually tailored, for example, empirically, to provide a surface coating of desired thickness with the given application technique. A commercial example of an MPL is known as Electrode Los Alamos Type produced by DeNora North America, Etek Division. Micro-porous layers are also described in various literature, for example, "Handbook of Fuel Cells—Fundamentals, Technology, and Applications", edited by Wolf Vielstich, Hubert Gasteiger, Arnold Lamm, Volume 3, "Fuel Cell Technology and Applications", Chapter 46, copyright 2003 John Wiley and Sons, Ltd.

It is pointed out that if the diffusion media are given a hydrophilic treatment, the cell performance will drop because the hydrophilic treatment would inhibit transfer of excess water to the flowfield for ultimate removal from the fuel cell.

FIG. 1 depicts a typical prior art subsection 100 of a fuel cell employing a first MPL 102 adjacent to an anode catalyst 104 on the surface 106 of an anode diffusion media 108 and a second MPL 110 adjacent to a cathode catalyst 112 on the surface 114 of a cathode diffusion media 116, wherein 118 is the solid polymer electrolyte or ion exchange membrane. The MEA 120, typically, consists of, collectively, elements 104, 118, and 112.

Other methods have also been proposed to remove water from the catalyst layers, especially on the cathode side, such as placing holes in the diffusion media and embossing a pattern onto the diffusion media. Placing holes in an MPL having a uniform thickness perpendicular to the plane of the electrodes (the Z direction of FIG. 1) and a pattern of hydrophobic treatment on hydrophilic diffusion media have also been proposed. U.S. Pat. Nos. 5,840,438, 6,117,579, 6,521,369, and 6,579,639 exemplify these methods.

However, placing holes in an MPL or the diffusion media or embossing the diffusion media compromise the mechanical, electrical and thermal integrity of the diffusion media. Hydrophilic treatments of the diffusion, media would inhibit transfer of excess water to the flowfield for ultimate removal from the cell. In addition, by situating a MPL having a sharp interface with the substrate perpendicular to the plane of the electrodes (the Z direction of FIG. 1), water within the diffusion media can form a film at the MPL-substrate interface, for example surfaces 106 and 114 of FIG. 1. Such a film, particularly if continuous, would significantly reduce transfer of reactant gases and reduce the limiting current.

Accordingly, what is needed in the art is a method providing better management of reactant gases and water within fuel cells.

SUMMARY OF THE INVENTION

The present invention is a continuous MPL, consisting of a micro-porous media, applied to one surface on the electrode side of at least one or more diffusion media of a fuel cell, wherein a geometric pattern, for example, dots or stripes, of micro-porous media is also introduced into each diffusion media to which the MPL has been applied. Accordingly, provided by the geometric pattern is a multiplicity of regions of micro-porous media interposed between a multiplicity of regions without micro-porous media within each diffusion media to which the MPL has been applied wherein non-uniformity of micro-porous media between the multiplicity of regions of micro-porous media and the multiplicity of regions without micro-porous media, perpendicular to the electrodes (the Z direction of FIG. 1), within each diffusion media is achieved, whereby the regions of micro-porous media may or may not be continuous (in contact) with the MPL.

Each diffusion media to which the MPL has been applied has, preferably, a higher through plane permeability (in the Z direction of FIG. 1) of the micro-porous media relative to in plane permeability (the XY plane of FIG. 1) of the micro-porous media to enhance penetration of the micro-porous media into each diffusion media relative to lateral dispersion (dispersion in the XY plane of FIG. 1) to the extent that the diffusion media substrate fiber orientation can be controlled thereby enhancing the non-uniformity of micro-porous media, perpendicular to the electrodes (the Z direction of FIG. 1) within each diffusion media.

The composition of micro-porous media creating the aforementioned MPL and regions of non-uniformity of micro-porous media are well known in the relevant art, as previously described. Techniques well known in the relevant art can also be used to adjust the composition of micro-porous media to affect the penetration (in the Z direction of FIG. 1) of the micro-porous media relative to in plane permeability (the XY plane of FIG. 1) of the micro-porous media to enhance penetration (in the Z direction of FIG. 1) of the micro-porous media into each diffusion media relative to lateral dispersion (dispersion in the XY plane of FIG. 1), thereby enhancing the non-uniformity of micro-porous media perpendicular to the electrodes (the Z direction of FIG. 1) within each diffusion media.

The aforementioned geometric pattern of micro-porous media creating the aforementioned multiplicity of regions of micro-porous media interposed between a multiplicity of regions without micro-porous media within each diffusion media to which the MPL has been applied can be introduced into the diffusion media by, for example, screen printing with a mask containing the geometric pattern wherein the geometric pattern, the composition of the micro-porous media, and application pressure of the micro-porous media on the surface of the diffusion media can be empirically adjusted to affect the penetration depth (in the Z direction of FIG. 1) of the micro-porous media into the diffusion media such that desired performance of water management of the diffusion media is achieved, as empirically determined by techniques well known in the relevant art.

Alternatively, the aforementioned geometric pattern may be pierced into the aforementioned surface of the diffusion media using, for example, a mask containing the geometric pattern to allow preferential penetration (in the Z direction of FIG. 1) of the micro-porous media thereby creating the aforementioned multiplicity of regions of micro-porous media interposed between a multiplicity of regions without micro-porous media within each diffusion media to which the MPL has been applied which can be introduced into the diffusion media by, for example, screen printing wherein the geometric pattern, the composition of the micro-porous media and application pressure of the micro-porous media on the surface of the diffusion media can be empirically adjusted to affect the penetration depth (in the Z direction of FIG. 1) of the micro-porous media into the diffusion media such that desired performance of water management of the diffusion media is achieved, as empirically determined by techniques well known in the relevant art.

The present invention ensures good water management of the diffusion media. The diffusion media and micro-porous media are, preferably, hydrophobic. The smaller pore size of the micro-porous media moves water to the larger pores of the diffusion media that does not contain micro-porous media and liquid water that is present in the larger pores of the diffusion media that does not contain micro-porous media cannot migrate to the smaller pores of the micro-porous media. Thus, the micro-porous media are relatively free or have a lower fraction of liquid water than the diffusion media without micro-porous media. Therefore, the micro-porous media comprising the continuous MPL functions as a check valve between the electrodes and diffusion media to ensure that water does not migrate back to the electrodes. Furthermore, the aforementioned multiplicity of regions of micro-porous media within each diffusion media to which the MPL has been applied provide conduits for gas passage to the electrodes while the multiplicity of regions without micro-porous media within each diffusion media to which the MPL has been applied provide regions for excess water movement to the flowfield for expulsion from the fuel cell. Also, water within the diffusion media can form a film which would occur at the MPL-diffusion media interface, for example surfaces 106 and 114 of FIG. 1. Such a water film, particularly if continuous, would significantly reduce transfer of reactant gases to the electrode and water to the flowfield and limit current production. The aforementioned non-uniformity of micro-porous media between the multiplicity of regions of micro-porous media and the multiplicity of regions without micro-porous media, perpendicular to the electrodes (the Z direction of FIG. 1), within each diffusion media to which the MPL has been applied break through and disrupt the continuity of this water film thereby creating preferential channels for gas diffusion to the electrodes and water movement away from the electrodes to the flowfield for expulsion from the fuel cell. Hence, water management of the diffusion media is accomplished through pore size difference between microporous media and substrate, not by variations in surface properties of the MPL or diffusion media.

In a first preferred embodiment of the present invention, a continuous MPL, consisting of a micro-porous media, is applied to one surface on the electrode side of at least one or more diffusion media of a fuel cell wherein a geometric pattern, for example, dots or stripes, of micro-porous media is also introduced into the same surface of each diffusion media, for example surfaces 106 and 114 of FIG. 1, to which the MPL is applied thereby forming a multiplicity of regions of microporous media interposed between a multiplicity of regions without micro-porous media within each diffusion media to which the MPL has been applied wherein non-uniformity of micro-porous media between the multiplicity of regions of micro-porous media and the multiplicity of regions without micro-porous media, perpendicular to the electrodes (the Z direction of FIG. 1), within each diffusion media is achieved whereby the regions of micro-porous media are continuous (in contact) with the MPL.

The geometric pattern of micro-porous media can be introduced into the diffusion media by, for example, screen printing a mask containing the geometric pattern wherein the geometric pattern, the composition of the micro-porous media, and application pressure of the micro-porous media on the surface of the diffusion media can be empirically adjusted to affect the penetration depth (in the Z direction of FIG. 1) of the micro-porous media into the diffusion media such that desired performance of water management of the diffusion media is achieved, as empirically determined by techniques well known in the relevant art.

Alternatively, the geometric pattern may be pierced into the surface of the diffusion media using, for example, a mask containing the geometric pattern to allow preferential penetration (in the Z direction of FIG. 1) of the micro-porous media which can be introduced into the diffusion media by, for example, screen printing wherein the geometric pattern, the composition of the micro-porous media and application pressure of the micro-porous media on the surface of the diffusion media can be empirically adjusted to affect the penetration depth (in the Z direction of FIG. 1) of the microporous media into the diffusion media such that desired performance of water management of the diffusion media is achieved, as empirically determined by techniques well known in the relevant art.

In a second preferred embodiment of the present invention, a continuous MPL, consisting of a micro-porous media, is applied to one surface on the electrode side of at least one or more diffusion media of a fuel cell wherein a geometric pattern, for example, dots or stripes, of micro-porous media is also introduced into the opposite surface (the flowfield side) of each diffusion media, for example surfaces on sides 122 and 124 (the flowfield sides) opposite to surfaces 106 and 114 (the electrode sides) of FIG. 1, to which the MPL is applied, thereby forming a multiplicity of regions of micro-porous media interposed between a multiplicity of regions without micro-porous media within each diffusion media to which the MPL has been applied wherein non-uniformity of microporous media between the multiplicity of regions of microporous media and the multiplicity of regions without microporous media, perpendicular to the electrodes (the Z direction of FIG. 1), within each diffusion media is achieved, whereby the regions of micro-porous media may or may not be continuous (in contact) with the continuous MPL.

The geometric pattern of micro-porous media can be introduced into the diffusion media by, for example, screen printing a mask containing the geometric pattern wherein the geometric pattern, the composition of the micro-porous media, and application pressure of the micro-porous media on the surfaces of the diffusion media can be empirically adjusted to affect the penetration depth (in the Z direction of FIG. 1) of the micro-porous media into the diffusion media such that desired performance of water management of the diffusion media is achieved, as empirically determined by techniques well known in the relevant art.

Alternatively, the geometric pattern may be pierced into the surface of the diffusion media using, for example, a mask containing the geometric pattern to allow preferential penetration (in the Z direction of FIG. 1) of the micro-porous media which can be introduced into the diffusion media by, for example, screen printing wherein the geometric pattern, the composition of the micro-porous media and application pressure of the micro-porous media on the surface of the diffusion media can be empirically adjusted to affect the penetration depth (in the Z direction of FIG. 1) of the microporous media into the diffusion media such that desired performance of water management of the diffusion media is achieved, as empirically determined by techniques well known in the relevant art.

Many variations in the embodiments of present invention are contemplated as described herein in more detail. Other applications of the present invention will become apparent to those skilled in the art when the following description of the best mode contemplated for practicing the invention is read in conjunction with the accompanying drawings.

BRIEF DESCRIPTION OF THE DRAWING

The description herein makes reference to the accompanying drawings wherein like reference numerals refer to like parts throughout the several views.

DESCRIPTION OF THE PREFERRED EMBODIMENT

Figure 2:
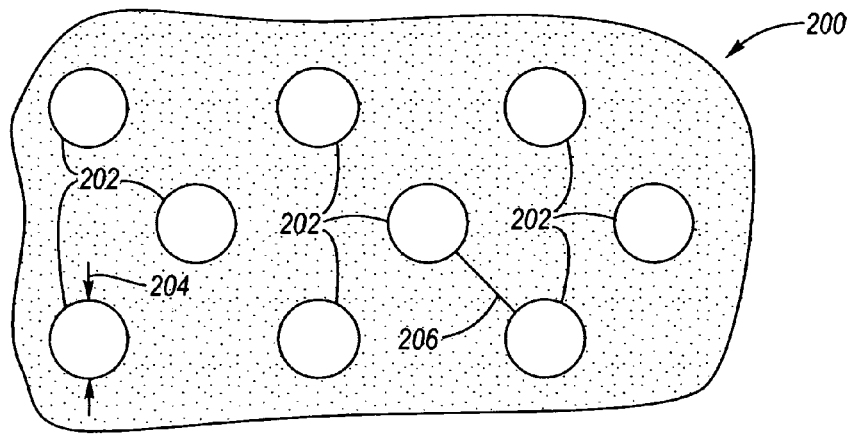
FIG. 2 depicts a plan view of a portion of a mask containing a geometric hole pattern according to the present invention.

FIG. 2 depicts a mask 200 containing a geometric hole pattern 202 utilized with the first and second preferred embodiments of the present invention wherein the hole size (diameter) 204 is 1/16 of an inch and the hole pitch 206 is 1/8 of an inch The hole size 204 and hole pitch 206 are empirically determined in accordance with the properties of the micro-porous media, the diffusion media, and application pressure of the micro-porous media on the surface of the diffusion media as previously described.

Figure 3:
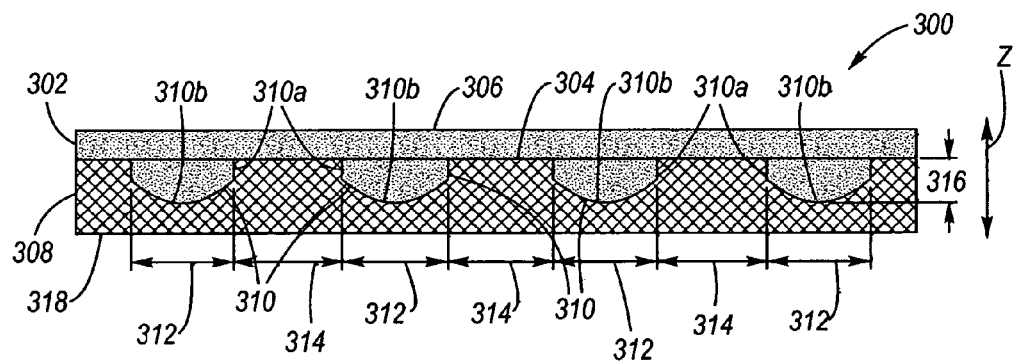
FIG. 3 is a sectional side view of an implementation of a first preferred embodiment according to the present invention.

FIG. 3 is a first example 300, utilizing the mask 200 of FIG. 2, of an implementation of a first preferred embodiment according to the present invention. A continuous MPL 302, consisting of a micro-porous media, is applied to one surface 304 on the electrode side 306 (opposite the flowfield side 318) of at least one or more diffusion media 308 of a fuel cell. A geometric dot pattern 310 of micro-porous media 310a is also introduced into a multiplicity of regions 310b in the same surface of each diffusion media to which the MPL is applied. Accordingly, provided is a multiplicity of regions of micro-porous media 312 interposed between a multiplicity of regions without micro-porous media 314 within each diffusion media to which the MPL has been applied. As a result, provided is non-uniformity of the micro-porous media 316 between the multiplicity of regions of micro-porous media and the multiplicity of regions without micro-porous media, perpendicular to the surfaces or electrodes (the Z direction), within each diffusion media. The regions of micro-porous media 310b are continuous (in contact) with the MPL 302 at the surface 304.

Figure 1:
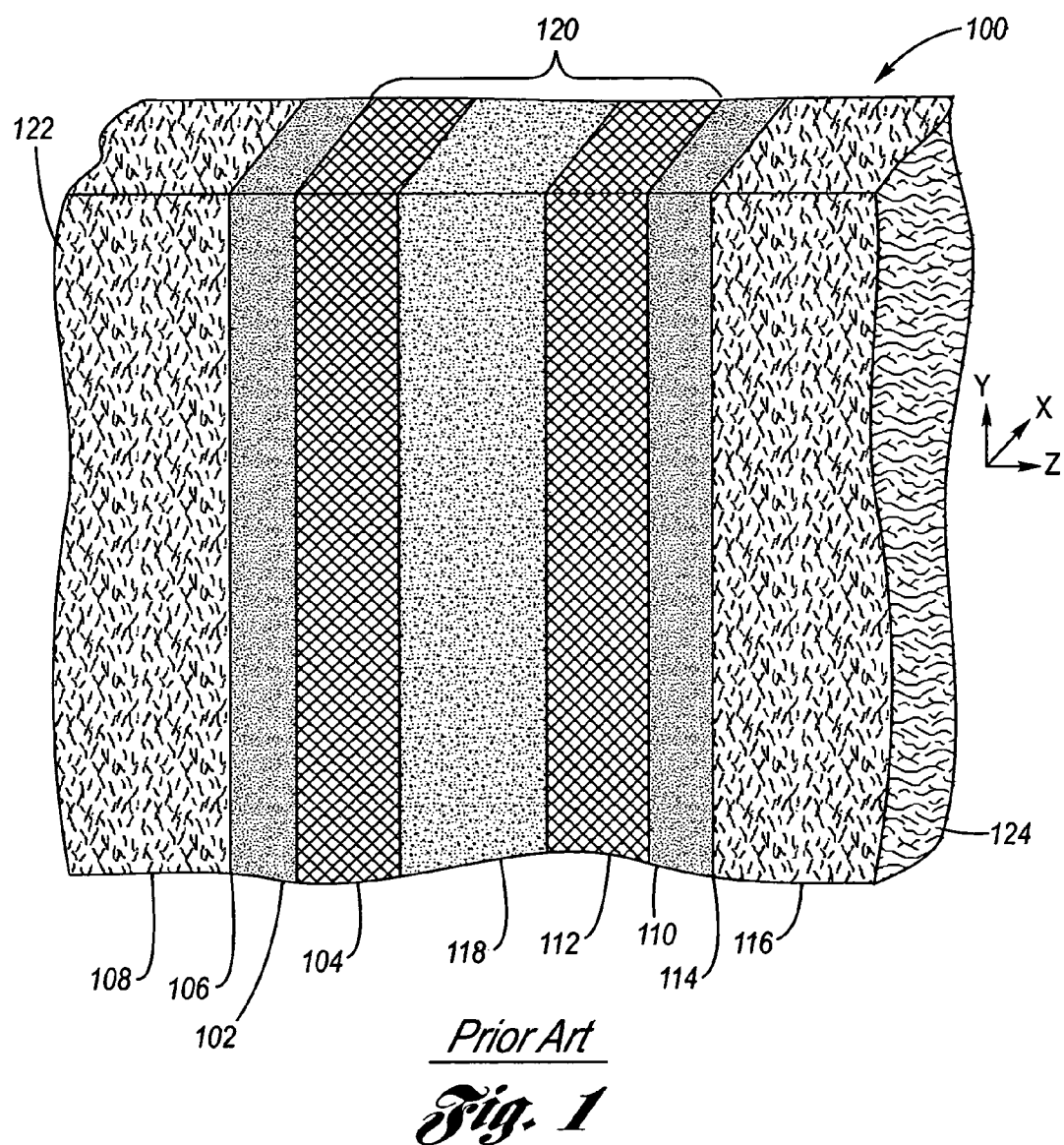
FIG. 1 depicts a perspective, broken-away view of a fuel cell employing micro-porous layers which is known in the prior art.

The geometric dot pattern 310 of micro-porous media 310a can be introduced into the diffusion media 308 by, for example, the screen printing mask 200, wherein the geometric hole pattern 202 thereof corresponds to the geometrical dot pattern 310, and wherein the composition of the micro-porous media, and application pressure of the micro-porous media on the surface 304 of the diffusion media can be empirically adjusted to affect the penetration depth 316 (in the Z direction) of the micro-porous media into the diffusion media such that desired performance of water management of the diffusion media is achieved, as empirically determined by techniques well known in the relevant art. Alternatively, the aforementioned geometric dot pattern 310 may be provided by regions 310b pierced into the aforementioned surface of the diffusion media using, for example, a mask containing the geometric pattern to allow preferential penetration (in the Z direction of FIG. 1) of the micro-porous media.

Figure 4:
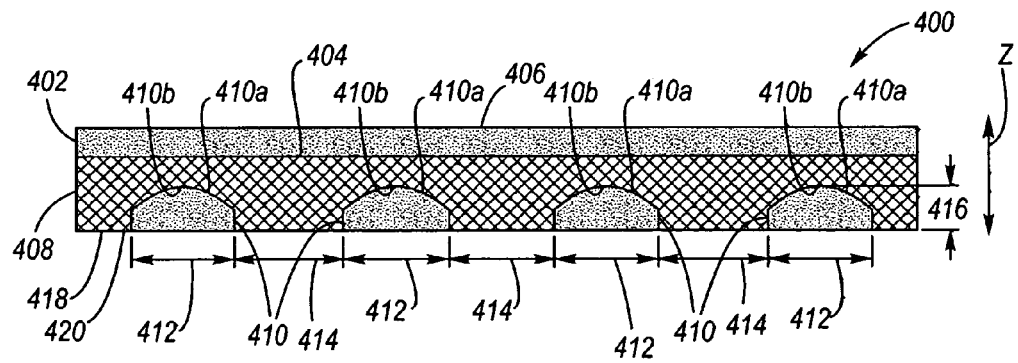
FIG. 4 is a sectional side view of an implementation of a second preferred embodiment according to the present invention.

FIG. 4 is a second example 400, utilizing the mask 200 of FIG. 2, of an implementation of a second preferred embodiment according to the present invention. A continuous MPL 402, consisting of a micro-porous media, is applied to one surface 404 on a surface at the electrode side 406 of at least one or more diffusion media 408 of a fuel cell. A geometric dot pattern 410 of micro-porous media 410a is also introduced into a multiplicity of regions 410b in the opposite surface 420 at the flowfield side 418 of each diffusion media to which the MPL is applied. Accordingly, provided is a multiplicity of regions of micro-porous media 412 interposed between a multiplicity of regions without micro-porous media 414 within each diffusion media to which the MPL has been applied. As a result, provided is non-uniformity of the micro-porous media 416 between the multiplicity of regions of micro-porous media and the multiplicity of regions without micro-porous media, perpendicular to the surfaces or electrodes (the Z direction) within each diffusion media. The regions of micro-porous media 410b may or may not be continuous (in contact) with the MPL at the surface 404.

The geometric dot pattern 410 of micro-porous media 410a can be introduced into the diffusion media 408 by, for example, the screen printing mask 200, wherein the geometric hole pattern 202 thereof corresponds to the geometric dot pattern 410, and wherein the composition of the micro-porous media, and application pressure of the micro-porous media on the surfaces 404, 420 of the diffusion media can be empirically adjusted to affect the penetration depth 416 (in the Z direction) of the micro-porous media into the diffusion media such that desired performance of water management of the diffusion media is achieved, as empirically determined by techniques well known in the relevant art. Alternatively, the aforementioned geometric dot pattern 410 may be provided by regions 410b pierced into the aforementioned surface of the diffusion media using, for example, a mask containing the geometric pattern to allow preferential penetration (in the Z direction of FIG. 1) of the micro-porous media.

Each fuel cell tested for FIGS. 5 through 8 used low density Toray (EXP003U) substrate with further micro-porous media treatment for the cathode diffusion media and Toray TGP 060 with 7 wt % PTFE (polytetrafluoroethylene) always for the anode diffusion media. General Motors micro-porous media formulation was introduced into the cathode diffusion media of each fuel cell as described in U.S. patent application Ser. No. 10/925,853, filed Aug. 25, 2004, the disclosure of which is hereby herein incorporated by reference, rather than the anode diffusion media, wherein the MPL of each fuel cell of FIGS. 5 and 6 utilized General Motors micro-porous media formulation on the surface of the cathode media on the cathode electrode side and each fuel cell of FIGS. 7 and 8 utilized Carbel MP30Z from Gore, a free-standing MPL, as the continuous MPL layer on the surface of the cathode media on the cathode electrode side, whereby a first preferred embodiment example and a second preferred embodiment example of the present invention was implemented in FIGS. 5 through 8. It is the be appreciated, as previously described, that results similar to FIGS. 5 through 8 could also be obtained by the utilization of other commercial micro-porous media produced by, for example, SGL Carbon (SGL). Results of measurements using high frequency resistance (HFR) techniques for measuring the electrical and ionic resistance of fuel cells, well known in the relevant art, are also displayed for each fuel cell in FIGS. 5 through 8.

Figure 5:
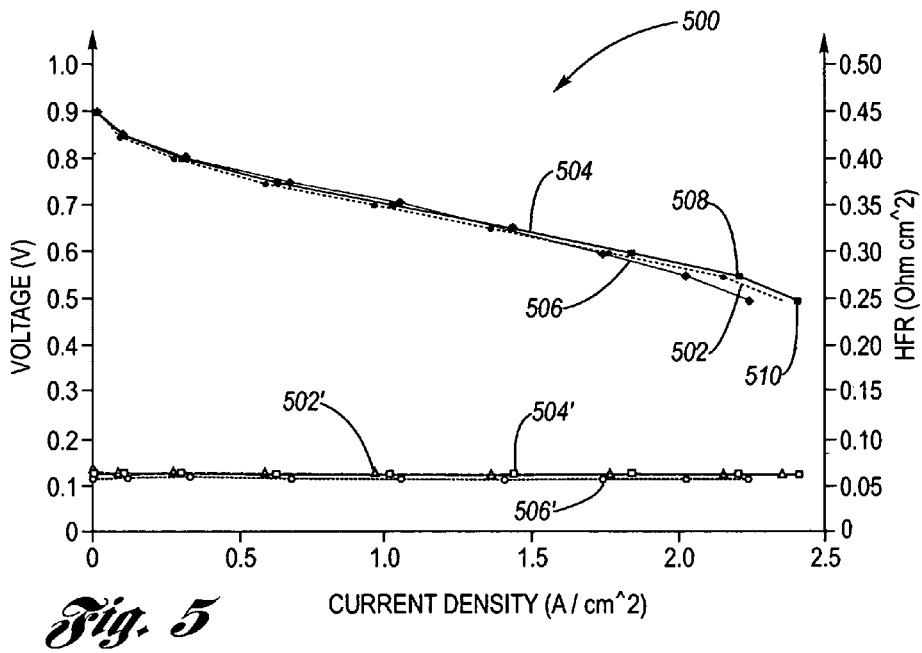
FIG. 5 is a plot comparing the performance of first through third fuel cells under wet conditions in accordance with the embodiments of FIGS. 3 and 4.
Figure 6:
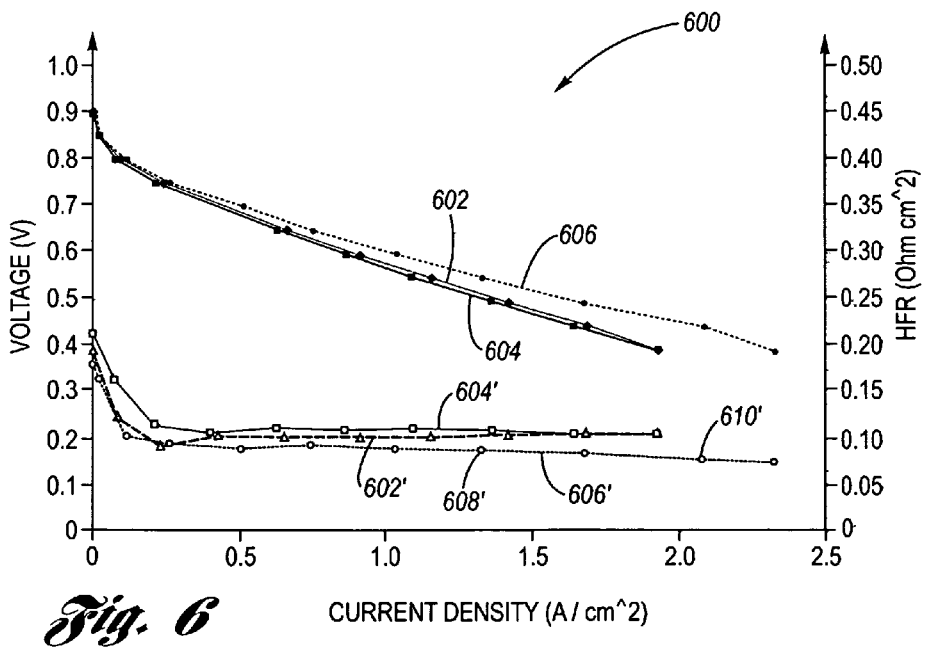
FIG. 6 is a plot comparing the performance of the first through third fuel cells of FIG. 5 under dry conditions in accordance with the embodiments of FIGS. 3 and 4.
Figure 7:
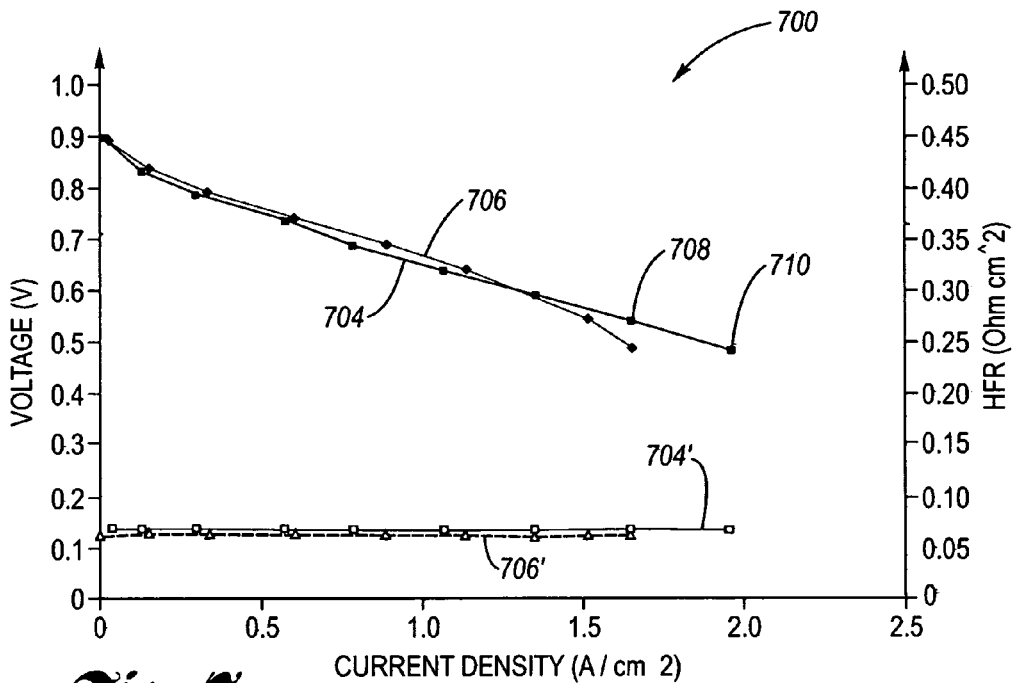
FIG. 7 is a plot comparing the performance of fourth and fifth fuel cells under wet conditions in accordance with the embodiments of FIGS. 3 and 4.
Figure 8:
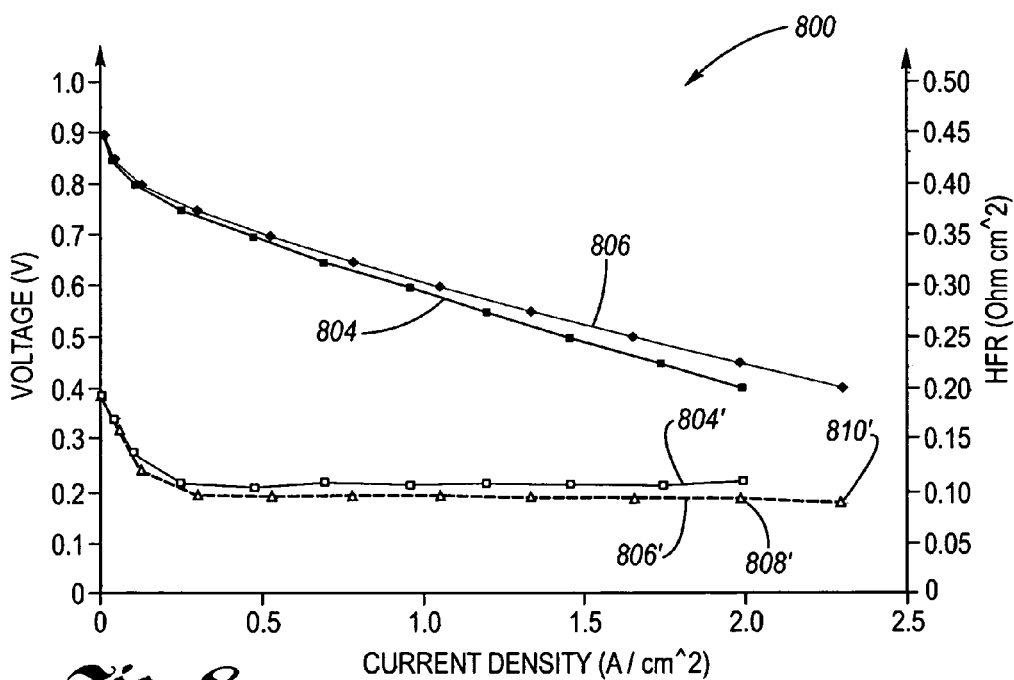
FIG. 8 is a plot comparing the performance of the fourth and fifth fuel cells of FIG. 7 under dry conditions in accordance with the embodiments of FIGS. 3 and 4.

Each fuel cell of FIGS. 5 and 7 was operated at 270 KPa absolute outlet pressure and a wet condition of 300% relative humidity of the outlet stream while each fuel cell of FIGS. 6 and 8 was operated at 100 KPa absolute outlet pressure and a dry condition of 84% relative humidity of the outlet stream. Outlet pressure parameters as well as the terms "wet" and "dry" are terminologies used and well understood by those in the relevant art.

Referring now to FIG. 5, plot 500 compares the performance of first through third fuel cells under wet conditions in accordance with the embodiments of FIGS. 3 and 4. Curves 502, 504, 506 of the first through third fuel cells, respectively, are associated with the voltage axis while curves 502', 504', 506' of the first through third fuel cells, respectively, are associated with the HFR axis.

The first fuel cell of curves 502, 502' utilized micro-porous media only on an MPL on the surface of the cathode diffusion media on the cathode electrode side and is utilized as a base line for comparison. The second fuel cell of curves 504, 504' utilized micro-porous media in accordance with FIG. 3 on the cathode diffusion media implementing the first preferred embodiment of the present invention. The third fuel cell of curves 506, 506' utilized micro-porous media in accordance with FIG. 4 on the cathode diffusion media implementing the second preferred embodiment of the present invention.

It can be seen in FIG. 5 that the second fuel cell of curve 504 implementing a first preferred embodiment of the present invention has a better performance than a first fuel cell of curve 502, whereby the voltage is higher for a given current for curve 504 compared to curve 502, as exemplified at points 508, 510, under wet conditions.

Referring now to FIG. 6, plot 600 compares the performance of the first through third fuel cells of FIG. 5 under dry conditions in accordance with the embodiments of FIGS. 3 and 4. Curves 602, 604, 606 of the first through third fuel cells, respectively, are associated with the voltage axis while curves 602', 604', 606' of the first through third fuel cells, respectively, are associated with the HFR axis.

It can be seen in FIG. 6 that the third fuel cell of curve 606 implementing the second preferred embodiment of the present invention has a better performance than a first fuel cell of curve 602, whereby the voltage is higher for a given current for curve 606 compared to curve 602 and whereby the HFR is lower for a given current for curve 606' compared to curve 602', as exemplified at points 608', 610', under dry conditions.

Referring now to FIG. 7, plot 700 compares the performance of fourth and fifth fuel cells under wet conditions in accordance with the embodiments of FIGS. 3 and 4. Curves 704, 706 of the fourth and fifth fuel cells, respectively, are associated with the voltage axis while curves 704', 706' of the fourth and fifth fuel cells, respectively, are associated with the HFR axis.

The fourth fuel cell of curves 704, 704' utilized micro-porous media in accordance with FIG. 3 on the cathode diffusion media implementing the first preferred embodiment of the present invention. The fifth fuel cell of curves 706, 706' utilized micro-porous media in accordance with FIG. 4 on the cathode diffusion media implementing the second preferred embodiment of the present invention.

In FIG. 7, the fourth fuel cell of curve 704 implementing a first preferred embodiment of the present invention has a better performance, exemplified by points 708, 710, than a base line fuel cell (not shown) utilizing only a free-standing MPL (Carbel MP30Z from Gore) on the surface of the cathode media on the cathode electrode side, wherein the performance of the base line fuel cell utilizing only a free-standing MPL (Carbel MP30Z from Gore) on the surface of the cathode media on the cathode electrode side is well known in the relevant art and would reach a maximum current density of, approximately, 0.4 to 1.0 A/cm² at 0.5 V under wet conditions.

Referring now to FIG. 8, plot 800 compares the performance of the fourth and fifth fuel cells of FIG. 7 under dry conditions in accordance with the embodiments of FIGS. 3 and 4. Curves 804, 806 of the fourth and fifth fuel cells, respectively, are associated with the voltage axis while curves 804', 806' of the fourth and fifth fuel cells, respectively, are associated with the HFR axis.

In FIG. 8, the fifth fuel cell of curve 806 implementing the second preferred embodiment of the present invention has a better performance, whereby the voltage is higher for a given current for curve 806 and whereby the HFR is lower for a given current for curve 806', as exemplified at points 808', 810', under dry conditions than a baseline fuel cell (not shown) utilizing only a free-standing MPL (Carbel MP30Z from Gore) on the surface of the cathode media on the cathode electrode side, wherein the performance of the base line fuel cell utilizing only a free-standing MPL (Carbel MP30Z from Gore) on the surface of the cathode media on the cathode electrode side is well known in the art under dry conditions and is similar to curve 804.

It is to be noted that, conventionally, as the diffusion media is highly porous, the micro-porous media comprising the MPL typically penetrates into the surface 304, 404 of the diffusion media immediately adjacent the MPL-diffusion media interface to a depth (in the Z direction of FIGS. 3, 4) with respect to the surface of approximately 10 to 100 micrometers. The penetration is of the whole MPL layer sinking into the diffusion media, which depends on the micro-porous media formulation and porosity of the diffusion media substrate. The fibers comprising the diffusion media, typically, do not move, but the micro-porous media comprising the MPL flows around the fibers comprising the diffusion media. In contrast according to the present invention, screen printing or piercing through a mask with a geometric pattern are examples of methods wherein non-uniformity of micro-porous media within a diffusion media is achieved, as previously described, wherein the range of penetration (in the Z direction of FIGS. 3, 4) of the micro-porous media 310a, 410a is approximately 50 to 200 micrometers. In the present invention, only a portion, per the geometric pattern, of the MPL is allowed to sink into the diffusion media. In this regard, control of where and how the MPL sinks into the diffusion media is achieved such that a non-uniform interface is provided therebetween which prevents the formation of a continuous liquid water film.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A diffusion media and micro-porous media combination for a fuel cell, comprising:
    a diffusion layer composed of a diffusion media, said diffusion layer having a first surface and an opposite second surface, wherein at least one of said first and second surfaces has a geometric pattern formed therein comprising a multiplicity of mutually spaced apart first regions, each first region of said plurality of first regions extending partly into said diffusion media from the one of said first and second surfaces without extending to the other of said first and second surfaces;
    a micro-porous media filling said multiplicity of first regions; and
    a micro-porous layer composed of the micro-porous media continuously applied to said first surface;
    wherein said multiplicity of first regions of the micro-porous media is interposed between a multiplicity of second regions without the micro-porous media.

2. The combination of claim 1, wherein said first surface comprises an electrode side of the diffusion layer, and said second surface comprises a flowfield side of the diffusion layer.

3. The combination of claim 2, wherein:
said geometric pattern is formed in said first surface of the diffusion layer;
said micro-porous media filling said multiplicity of first regions is located at said first surface; and
said micro-porous layer is located at said first surface.

4. The combination of claim 3, wherein the micro-porous media filling said multiplicity of first regions contacts said micro-porous layer.

5. The combination of claim 2, wherein:
said geometric pattern is formed in said second surface of the diffusion layer;
said micro-porous media filling said multiplicity of first regions is located at said second surface; and
said micro-porous layer is located at said first surface.

6. A fuel cell, comprising:
a diffusion layer composed of a diffusion media, said diffusion layer having a first surface and an opposite second surface, wherein at least one of said first and second surfaces has a geometric pattern formed therein comprising a multiplicity of mutually spaced apart first regions, each first region of said plurality of first regions extending partly into said diffusion media from the one of said first and second surfaces without extending to the other of said first and second surfaces;
a micro-porous media filling said multiplicity of first regions; and
a micro-porous layer composed of the micro-porous media continuously applied to said first surface;
wherein said first surface comprises an electrode side of the diffusion layer, and said second surface comprises a flowfield side of the diffusion layer; and
wherein said multiplicity of first regions of the micro-porous media is interposed between a multiplicity of second regions without the micro-porous media.

7. The combination of claim 6, wherein:
said geometric pattern is formed in said first surface of the diffusion layer;
said micro-porous media filling said multiplicity of first regions is located at said first surface; and
said micro-porous layer is located at said first surface.

8. The combination of claim 7, wherein the micro-porous media filling said multiplicity of first regions contacts said micro-porous layer.

9. The combination of claim 6, wherein:
said geometric pattern is formed in said second surface of the diffusion layer;
said micro-porous media filling said multiplicity of first regions is located at said second surface; and
said micro-porous layer is located at said first surface.

* * * * *